United States Patent
Chaumeny et al.

(10) Patent No.: US 8,334,459 B2
(45) Date of Patent: Dec. 18, 2012

(54) PLATE FOR ELECTRIC APPARATUS

(75) Inventors: Jean-Luc Chaumeny, Solignac (FR); Laurent Petit, Saint Paul (FR); Denys Toulemonde, Rilhac-Rancon (FR)

(73) Assignees: Legrand France, Limoges (FR); Legrand SNC, Limoges (FR)

( * ) Notice: Subject to any disclaimer, the term of this patent is extended or adjusted under 35 U.S.C. 154(b) by 456 days.

(21) Appl. No.: 12/625,760

(22) Filed: Nov. 25, 2009

(65) Prior Publication Data
US 2010/0132972 A1    Jun. 3, 2010

(30) Foreign Application Priority Data
Dec. 2, 2008   (FR) ..................................... 08 06763

(51) Int. Cl.
*H02G 3/14*   (2006.01)
(52) U.S. Cl. ............ 174/66; 174/67; 220/241; 220/242; 439/536
(58) Field of Classification Search ................ 174/66, 174/67, 53, 55, 135, 17 CT; 220/241, 242, 220/3.8; 439/536, 135; D13/156, 157
See application file for complete search history.

(56) References Cited

U.S. PATENT DOCUMENTS

| | | | | |
|---|---|---|---|---|
| 3,953,933 A | * | 5/1976 | Goldstein | 174/66 |
| 4,733,330 A | * | 3/1988 | Tanaka et al. | 174/66 |
| 4,800,239 A | * | 1/1989 | Hill | 174/66 |
| 5,041,698 A | * | 8/1991 | Takagi et al. | 174/66 |
| 5,180,886 A | * | 1/1993 | Dierenbach et al. | 174/66 |
| 5,895,888 A | * | 4/1999 | Arenas et al. | 174/66 |
| 6,281,440 B1 | * | 8/2001 | Baldwin et al. | 174/66 |
| 6,417,450 B1 | * | 7/2002 | Young | 174/66 |
| 7,102,081 B2 | * | 9/2006 | Xu et al. | 174/66 |
| 7,122,740 B2 | * | 10/2006 | Xu et al. | 174/66 |

FOREIGN PATENT DOCUMENTS

| | | |
|---|---|---|
| JP | 57-078214 U | 5/1982 |
| JP | 60-009312 A | 1/1985 |

OTHER PUBLICATIONS

French Search Report, dated Jul. 13, 2009, from corresponding French application.

* cited by examiner

*Primary Examiner* — Angel R Estrada
(74) *Attorney, Agent, or Firm* — Young & Thompson

(57) ABSTRACT

A cover plate (2) for electrical apparatus (1) includes at least one opening (22, 32) intended to provide access to at least one functional part (5) of the electrical apparatus and which is formed by superimposing a rear mounting plate (20, 30) fitted at the back with elements for mounting on an apparatus support (4) and a front finish plate (10) giving the cover plate an aesthetic appearance. The rear mounting plate includes on its front side a recessed housing (24) which completely houses the front finish plate, such that the front side (11) of the front finish plate extends flush with or is slightly back from the front side (21) of the rear mounting plate.

14 Claims, 5 Drawing Sheets

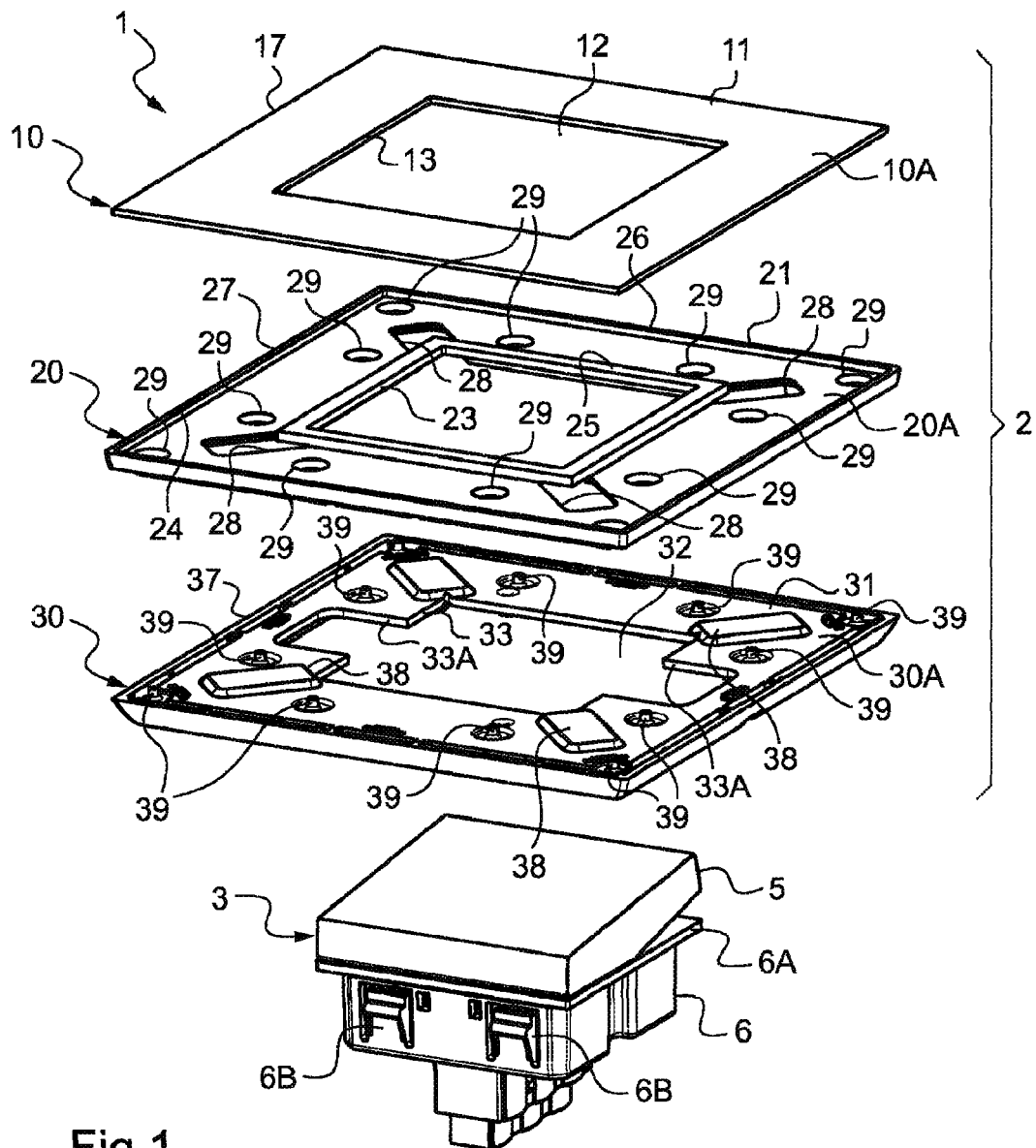
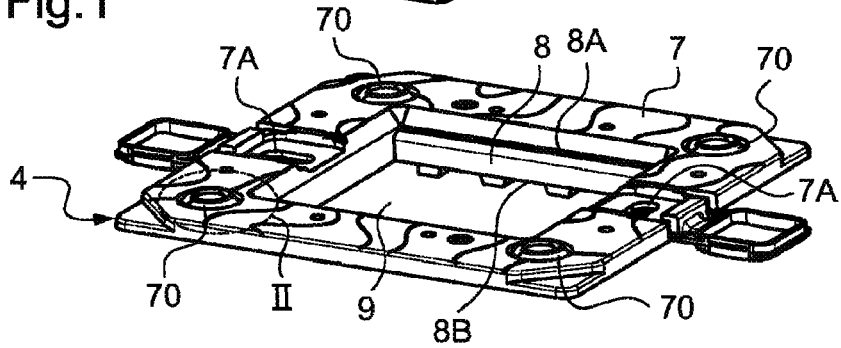
Fig.1

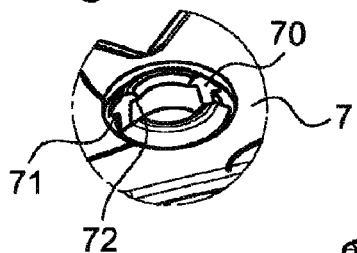
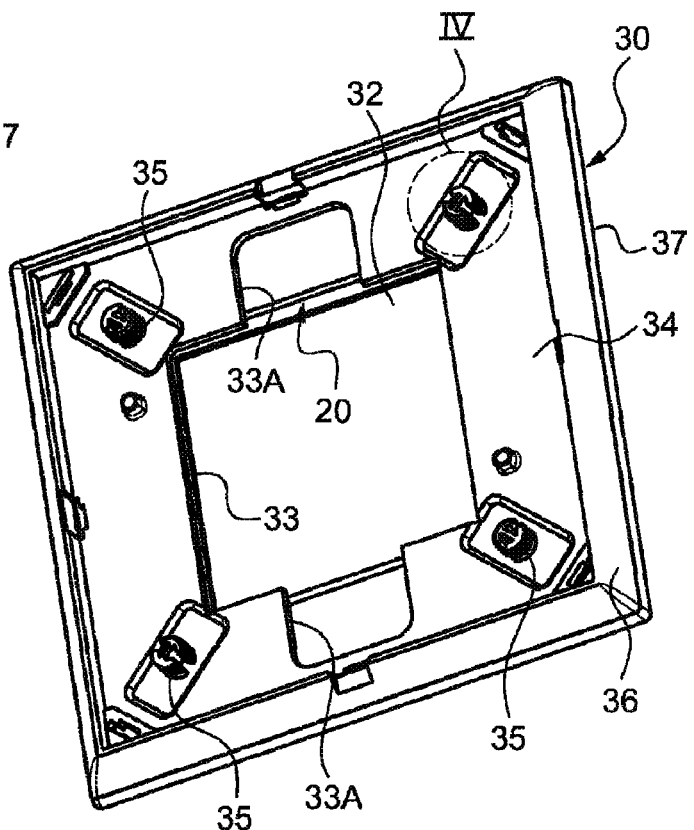
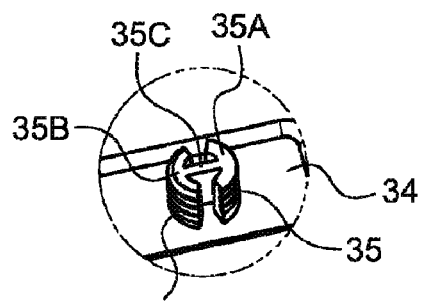
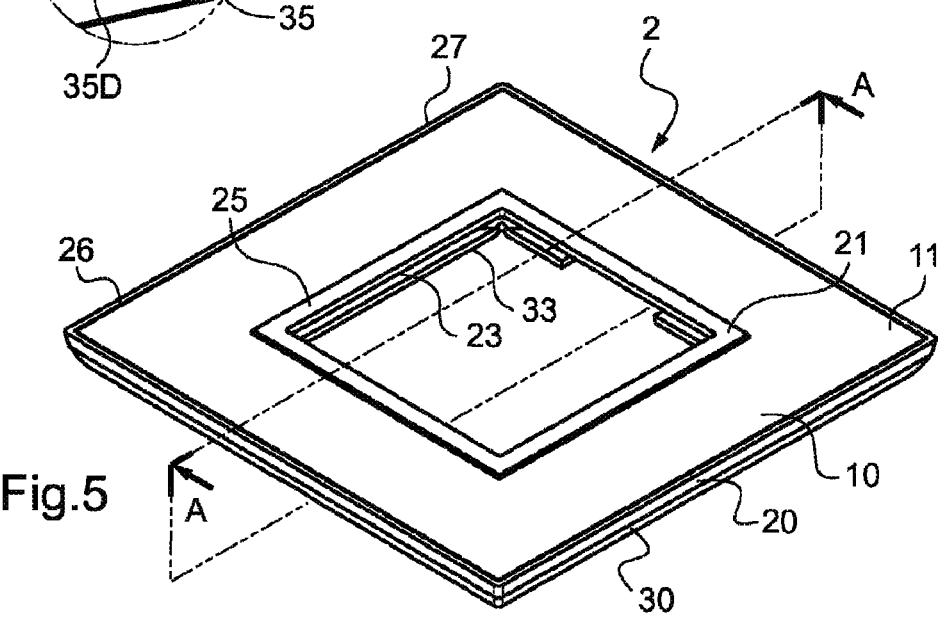

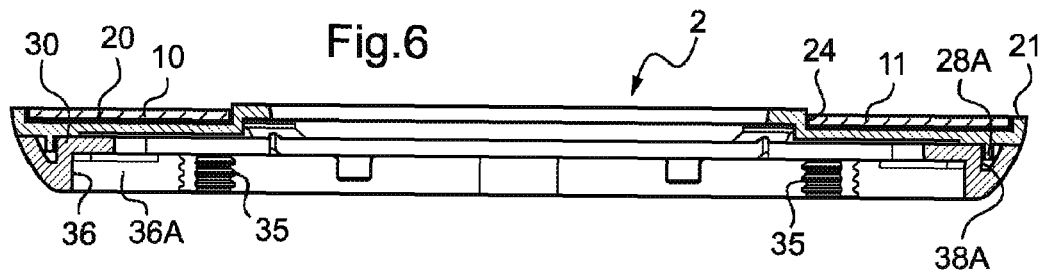
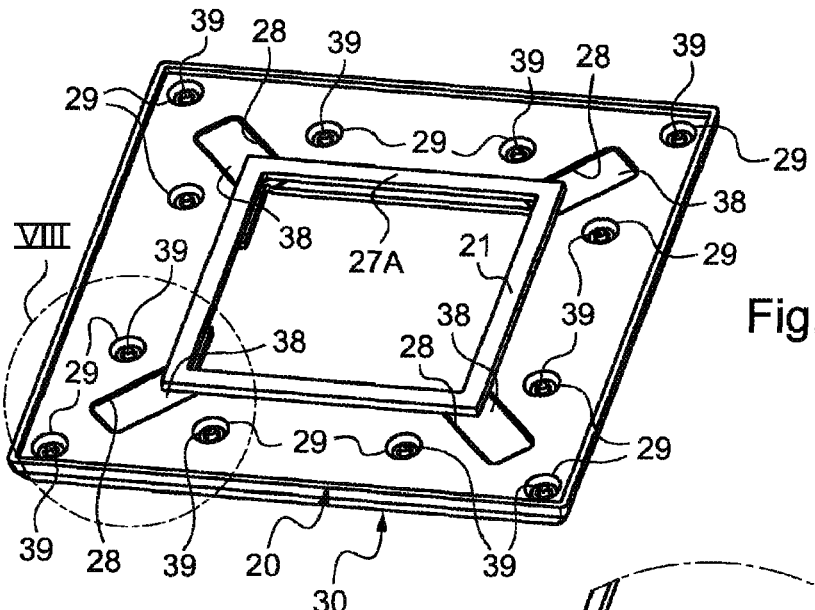
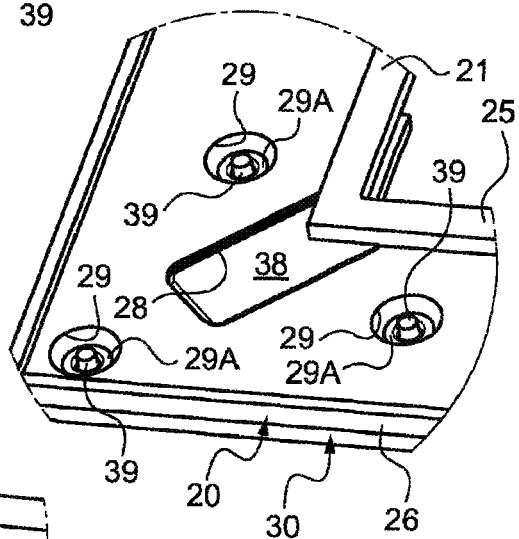
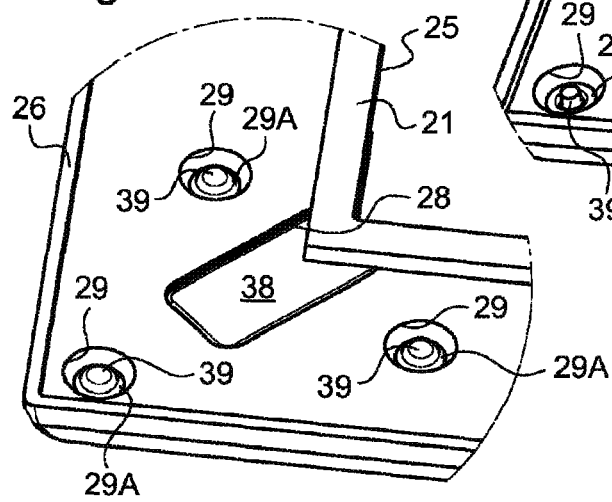

PLATE FOR ELECTRIC APPARATUS

TECHNICAL FIELD TO WHICH THE INVENTION RELATES

The present invention relates generally to electrical apparatus.

It relates more particularly to a cover plate for electrical apparatus which comprises at least one opening intended to provide access to at least one functional part of the electrical apparatus and which is formed by superimposing a rear mounting plate fitted at the back with means for mounting on an apparatus support and a front finish plate giving said cover plate an aesthetic appearance.

It also relates to an electrical apparatus comprising an apparatus support supporting an apparatus mechanism with on the front side at least one functional part and on which a cover plate such as that mentioned above is mounted.

TECHNOLOGICAL BACKGROUND

In the cover plates already known, the dimensions of the front finish plate and the rear mounting plate are similar such that they can be superimposed almost perfectly.

The thickness of the cover plate is therefore that of the finish plate superimposed on the mounting plate. Since the thickness of the finish plate varies depending on the finish material used, currently, the thickness of each cover plate is different for each finish material.

Furthermore, in these cover plates, the finish plate must be made with the greatest care, firstly, to prevent the appearance of unacceptable faults such as burrs, burns or chips on the visible outer edge and, secondly, to ensure that its inner edge, which delimits each opening of the finish plate, mates perfectly with each functional part of the electrical apparatus. The cost of manufacturing these plates therefore turns out to be relatively high.

PURPOSE OF THE INVENTION

To overcome the disadvantages of the state of the art, this invention proposes a cover plate with the same thickness irrespective of the finish material used, whose weight can be relatively high to give the user an impression of good quality, which avoids the problems of faults on the edge of the finish plate, is simple to implement and is easy to change.

More particularly, the invention proposes a cover plate as defined in the introduction, wherein the rear mounting plate comprises on its front side a recessed housing which completely houses said front finish plate, such that the front side of said front finish plate extends flush with or is slightly back from the front side of said rear plate.

Thus, thanks to the invention, the front finish plate can be made from a material more pleasing to the eye and to the touch that the material used for the rear finish plate.

In particular, it will be possible to make the front finish plate in an expensive material without significantly increasing the total cost of the cover plate.

It will also be possible to make this front finish plate in a material difficult to dimension, without any dimensioning faults impairing the aesthetics of the cover plate. The rear mounting plate will therefore be made from a material easier to dimension and will cover the edge of the front finish plate, so as to hide any faults present on this front finish plate.

In addition, since the rear mounting plate is preferably made from a material different from that of the front finish plate, it can be made from a material heavier than that of the front finish plate, to give the user an impression of good quality.

Other advantageous and non-limiting characteristics of the cover plate according to the invention are as follows:
- the rear mounting plate is formed from a single piece;
- the rear mounting plate is formed by superimposing an intermediate plate and a sub-plate, the intermediate plate being equipped with a recessed housing to house said front finish plate and the sub-plate comprising said mounting means on the rear side;
- the sub-plate and the intermediate plate are undetachably fastened to each other;
- the housing is delimited between an inner peripheral edge bordering said opening and an outer peripheral edge;
- the inner and outer peripheral edges are covered by a coating giving said cover plate an aesthetic appearance;
- said coating is made from chromium;
- the front finish plate and the rear mounting plate are undetachably fastened to each other;
- the front finish plate and the rear mounting plate are detachably fastened to each other;
- the front finish plate has a thickness of between 0.5 and 2 millimetres, preferably between 1 and 1.5 millimetres;
- the front finish plate comprises a rigid core and a skin which covers at least the front side of the rigid core to give said cover plate an aesthetic appearance;
- the front finish plate and the rear mounting plate are made from different materials;
- the rear mounting plate is made by one or more moulding operations; and
- the front finish plate is made by laser cutting.

The invention also relates to an electrical apparatus comprising an apparatus support supporting an apparatus mechanism with on the front side at least one functional part, and a cover plate as mentioned above, whose opening borders the functional part of the apparatus mechanism and whose means for mounting the rear mounting plate are mounted in arrangements of the apparatus support.

DETAILED DESCRIPTION OF AN EMBODIMENT

There follows a description with reference to the accompanying drawings given as non-limiting examples, showing what the invention consists in and how it can be implemented.

In the accompanying drawings:

FIG. 1 is an exploded view of a first embodiment of an electrical apparatus according to the invention;

FIG. 2 is a detail view of zone II of FIG. 1;

FIG. 3 is a rear perspective view of the sub-plate of FIG. 1;

FIG. 4 is a detail view of zone IV of FIG. 3;

FIG. 5 is an assembled perspective view of the cover plate of FIG. 1;

FIG. 6 is a cross-sectional view along plane A-A of FIG. 5;

FIG. 7 is a perspective view of the sub-plate and the intermediate plate shown on FIG. 1, in assembled position;

FIGS. 8 and 9 are diagrams showing the assembly of the sub-plate with the intermediate plate, representing in detail zone VIII of FIG. 7;

Figure 10:
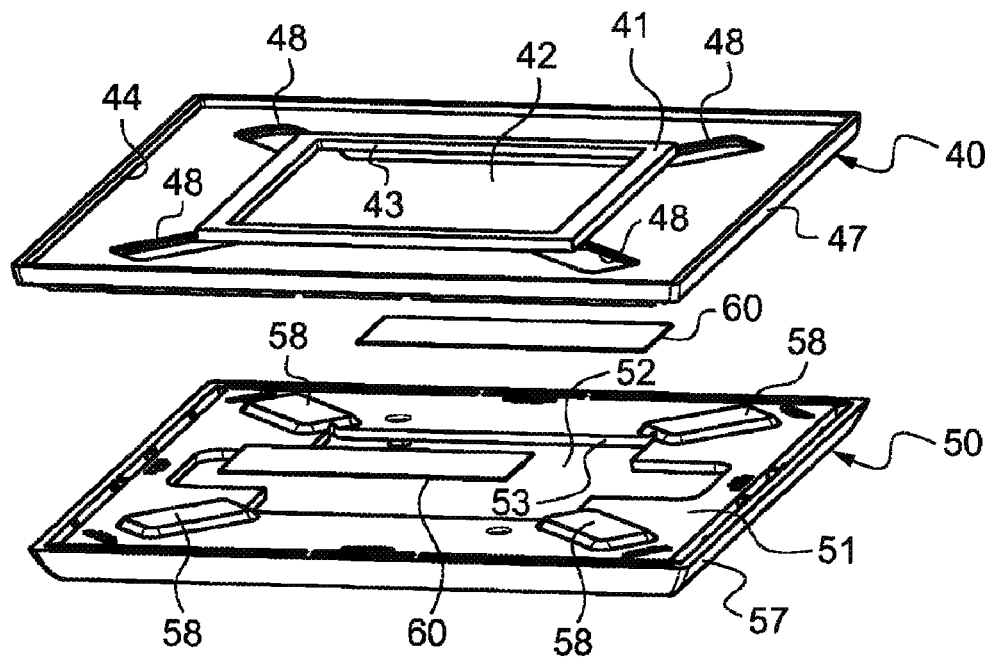
FIG. 10 is an exploded perspective view of a second embodiment of the sub-plate and the intermediate plate of the cover plate according to the invention.

FIG. 1 shows an exploded view of an electrical apparatus 1 which comprises an apparatus support 4, as well as an apparatus mechanism 3 and a cover plate 2 mounted on this apparatus support 4.

In this case, the apparatus support 4 has the shape of a square, flat frame 7, which comprises a core made from metallic material overmoulded with a skin of insulating synthetic material.

This frame 7 has an inner edge 8 which delimits a central opening 9, also square, to receive the apparatus mechanism 3.

In addition, it comprises in the middle of two opposite branches, two rectangular slots 7A to attach the apparatus support 4 on a box (not shown) flush-mounted in a wall or mounted on the surface of such wall. Each of these two slots 7A is intended to be positioned opposite a tubular drum arranged in said box to receive the threaded body of a mounting screw.

This apparatus support 4 can therefore be used to immobilise the apparatus mechanism 3 in said box.

The apparatus mechanism 3 comprises in this case a base 6 made from insulating material which is open on the front side and which houses internally electrical connection terminals, not shown. The base 6 is closed at the front by the functional part 5 of the electrical apparatus.

In this case, the electrical apparatus 1 acts as a switch and the functional part 5 consists of a rocker switch on the base 6.

As a variant, the electrical apparatus could include other functions such as power outlet, telephone socket, network socket or two-way switch, with in this case the shape of the functional part of the electrical apparatus 1 being different from that shown on FIG. 1.

In this case, the base 6 is housed in the central opening 9 of the frame 7 of the apparatus support 4. To immobilise it in this central opening 9, the base 6 has firstly a peripheral rim 6A resting on two shoulders 8A extending along two opposite sides of the inner edge 8 of the frame 7, and secondly clipping teeth 6B which hook into matching hooking ribs 8B provided at the back of the shoulders 8A.

FIGS. 1 to 9, 10, and 11 to 13 show three embodiments of the cover plate 2; 102 of the electrical apparatus 1. This cover plate 2; 102 represents an aesthetic way of covering the apparatus support 4, so that it is not seen by the user.

In these three embodiments, the cover plate 2; 102 is formed by superimposing a rear mounting plate 20, 30; 40, 50; 120 (in one or two parts) and a front finish plate 10; 110.

The rear mounting plate has an opening 22; 122 which borders the functional part 5 of the electrical apparatus 1, in this case its rocker switch, to allow access by the user. In addition, this rear mounting plate is equipped at the back with mounting means 35; 125 on the apparatus support 4.

The front finish plate gives the cover plate 2; 102 an aesthetic appearance.

According to an especially advantageous characteristic of the invention, said rear mounting plate 20, 30; 40, 50; 120 comprises on its front side a recessed housing 24; 44; 124 which completely houses said front finish plate 10; 110, such that the front side 11; 111 of said front finish plate 10; 110 extends flush with or is slightly back from the front side 21; 41; 121 of said rear mounting plate 20, 30; 40, 50; 120.

In the three embodiments of the invention shown on FIGS. 1 to 13, the front finish plate 10; 110 has the shape of a square flat frame 10A; 110A.

Obviously, it could have a different shape, as long as this shape corresponds to that of the housing 24; 44; 124 receiving it.

Figure 11:
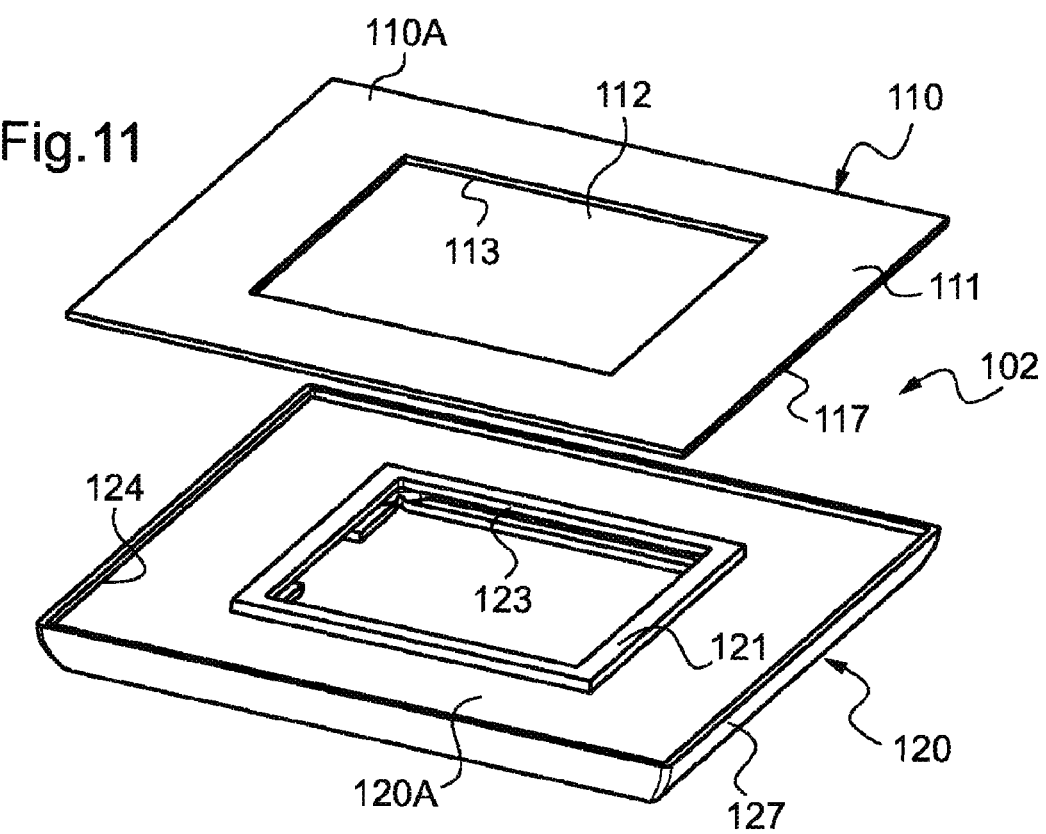
FIG. 11 is an exploded view of a third embodiment of the cover plate of FIG. 1.

In this case, as shown more particularly on FIGS. 1 and 11, the front finish plate 10; 110 has a constant thickness of between 0.5 and 2 millimetres, preferably between 1 and 1.5 millimetres.

It is delimited between a square outer edge 17; 117 and an inner edge 13; 113, also square, which defines a central opening 12; 112. It has a front side 11; 111 accessible to the user and a rear opposite side positioned against the bottom of the housing 24; 124 receiving it.

This front finish plate 10; 110 is made from a material which is more noble than that or those used to make the rear mounting plate 20, 30; 40, 50; 120. A more noble material is taken to mean a material which is softer to touch and/or more aesthetic. As non-limiting examples, the front finish plate 10; 110 could be made from wood, leather, brushed steel, braided metal, etc.

Preferably, this front finish plate 10; 110 is formed from a single piece, for example by laser cutting of a sheet of leather or a metal strip.

As a variant, it could have a two-material structure, with a rigid core covered, at least on the front side, by an aesthetic skin accessible to the user. In particular, it could comprise a metallic core giving it a specific weight and rigidity, and a leather or wood skin pleasing to the eye and to the touch. More precisely, this skin could either cover the entire metallic core, its front side only, or its front side and its edge.

Thanks to this two-material structure, a wide variety of different cover plates can be manufactured, while ensuring that these plates all have the same geometrical and mechanical characteristics.

The rear mounting plate 20, 30; 40, 50; 120 may have different shapes. In the three embodiments shown on FIGS. 1 to 13, we will describe three special shapes of this rear mounting plate.

In the first embodiment of the invention shown on FIGS. 1 to 9, the rear mounting plate is formed by superimposing an intermediate plate 20 and a sub-plate 30, assembled together by heat welding.

The cover plate 2 is therefore formed by superimposing a sub-plate 30 which comprises on the rear side the means 35 for mounting on the apparatus support 4, an intermediate plate 20 which has a recessed housing 24, and a front finish plate 10 which is housed in this housing 24.

In this case, the intermediate plate 20 has the shape of a square flat frame 20A. It is formed from a single piece by moulding a synthetic or metallic material such as, for example, zamak (an alloy of zinc, aluminium, magnesium and possibly copper).

As shown more particularly on FIGS. 1 and 5, the intermediate plate 20 is delimited between a square outer edge 27 and an inner edge 23, also square, which delimits a central opening 22. It has a font side 21 and a rear opposite side which is positioned against the sub-plate 30.

The housing 24 consists of a recess made in the front side 21 of this intermediate mounting plate 20 whose shape is, in negative, that of the front finish plate 10. In this case therefore, the housing 24 has a constant depth, equal to the thickness of the front finish plate 10, such that the front side 11 of the front finish plate 10 extends exactly flush with the front side 21 of the intermediate plate 20 (see FIG. 6).

The front sides 11, 21 of the intermediate plate 20 and of the front finish plate 10 therefore join up continuously, forming no discontinuity that would be inaesthetic, unpleasant to the touch and likely to trap dust and dirt.

As a variant, the housing could be designed to have a depth strictly greater than the thickness of the front finish plate, such that the front side of the front finish plate lies below the front side of the intermediate plate. Preferably therefore, the front side of the front finish plate will be less than one millimetre below the front side of the intermediate plate.

In this case, however, the dimensions of the inner edge 23 of the intermediate plate 20 are equal, to within the tolerances, to those of the functional part 5 of the electrical apparatus 1 (the rocker switch). The intermediate plate 20 therefore borders this functional part 5 perfectly, without leaving an inaesthetic gap.

The dimensions of the outer edge 27 are greater than those of the apparatus support 4, such that the cover plate 2 covers the entire front side of the latter.

The intermediate plate 20 comprises in this case two peripheral edges, inner 25 and outer 26, which run respectively alongside its inner 23 and outer 27 edges and which delimit between them the housing 24 (see FIG. 5). These two peripheral edges, inner 25 and outer 26, mask the inner and outer edges of the front finish plate 10, so that the latter is not inadvertently caught, thereby making it harder to tear out of the housing 24.

The intermediate plate 20 is therefore visible to the user at these two peripheral edges, inner 25 and outer 26. Advantageously, these two peripheral edges are covered by a coating which gives the cover plate 2 an aesthetic appearance. In this case, the coating is made from chromium. Obviously, it could be made differently.

Preferably, the front finish plate 10 is undetachably housed in the housing 24. It is therefore glued on its rear side against the bottom of the housing 24. Its outer 17 and inner 13 edges could also be glued to the peripheral edges 25, 26 of the intermediate plate 20, to prevent it from shrinking over time.

As a variant, the front finish plate could also be fastened in the housing of the intermediate plate by other undetachable attachment means, such as for example welding, clipping or interlocking.

As a further variant, the front finish plate could be detachably housed in the housing, so that it can be interchanged with other front finish plates made from different materials. The user can therefore change the appearance of the cover plate as required to adapt it to his taste and the decoration of the room where the switch is fitted. The means for attaching the front finish plate in the housing will then be chosen to be non-permanent (slightly adhesive glue, clipping, magnets, etc.).

As shown on FIGS. 1 and 3, the sub-plate 30 has the shape of a square flat frame 30A, with a front side 31 and an opposite rear side 34. In this case, it is formed from a single piece by moulding in synthetic material, for example polycarbonate.

This sub-plate 30 is delimited between a square outer edge 37 and a substantially square inner edge 33, which defines a central opening 32.

The dimensions of the inner edge 33 are identical to those of the inner edge 23 of the intermediate plate 20. In addition, in two opposite sides, the inner edge 33 comprises two rectangular notches 33A which extend the central opening 32 opposite the two slots 7A of the frame 7 of the apparatus support 4. Consequently, the heads of the mounting screws inserted through these slots 7A do not interfere with the sub-plate 30.

The dimensions of the outer edge 37 are identical to those of the outer edge 27 of the intermediate plate 20, such that these outer edges 27, 37 are perfectly flush with each other. For aesthetic considerations, the outer edge 37 of the sub-plate 30 could be covered with a coating identical to that covering the outer edge 27 of the intermediate plate 20.

As shown more precisely on FIGS. 3 and 6, the rear side of the sub-plate 30 has a peripheral rib 36 which borders its outer edge 37, thereby delimiting, at the back of the sub-plate 30, a housing 36A to receive the apparatus support 4. This peripheral rib 36 is therefore designed to be applied against the wall, all around the apparatus support 4, to mask the edge of the latter.

The mounting means 35, 70 used to mount the sub-plate 30 on the apparatus support 4 are shown more especially on FIGS. 1 to 4. In this case, they are detachable and consist more particularly of clipping means.

These clipping means comprise at each corner of the frame 30A, a pin 35 which projects perpendicularly out of the rear side 34 of this frame 30A.

As shown on FIG. 4, each pin 35 comprises a cylindrical wall split longitudinally into two parts 35A, 35B and reinforced by a rib 35C connecting these two parts 35A, 35B together. The outside of each pin 35 is grooved to form circular locking teeth 35D.

The apparatus support 4 comprises matching studs 70, separate from the frame 7 of the apparatus support 4 and clipped in through holes provided at each corner of this frame 7.

Each stud 70 comprises a tubular body, with a rear end (not shown on the figures) closed and surrounded by a crown which presses against the rear side of the frame 7, and a front end slit longitudinally and surrounded with an outer circular tooth 71 which hooks onto the front side of the frame 7 (see FIG. 2).

Each stud 70 also has, on the side of this front end, an inner circular tooth 72 which hooks onto one of the locking teeth 35D of one of the pins 35 of the sub-plate 30.

These studs 70 and these pins 35 cooperate to immobilise the cover plate 2 on the apparatus support 4.

As shown more particularly on FIGS. 1 and 7 to 9, the sub-plate 30 comprises undetachable means for assembly with the intermediate plate 20.

The sub-plate 30 and the intermediate plate 20 comprise more particularly complementary centring means 28, 38 and attachment means 29, 39.

The centring means comprise, firstly, four openings 28 made in the intermediate plate 20 and, secondly, four corresponding protuberances 38 projecting from the front side 31 of the sub-plate 30 and housed in the openings 28 of the intermediate plate 20.

The openings 28 are more precisely located in the back wall of the housing 24 of the intermediate plate 20, at each corner of the frame 20A. In this case, they are rectangular and extend lengthwise from the inner edge 23 of the frame 20A, along the diagonals of this frame 20A.

The attachment means comprise, firstly, twelve tubular holes 29 made in the intermediate plate 20 and, secondly, twelve cylindrical pins 39 projecting from the front side 31 of the sub-plate 30 and housed in the tubular holes 29 of the intermediate plate 20.

The tubular holes 29 extend more precisely in the back wall of the housing 24 of the intermediate plate 20, there being three tubular holes 29 around each rectangular opening 28.

Advantageously, each tubular hole 29 has, on the rear side 34 of the sub-plate 30, a reduction in cross-section which defines a shoulder 29A (see FIGS. 8 and 9).

To assemble the sub-plate 30 with the intermediate plate 20, the cylindrical pins 39 and the protuberances 38 of the sub-plate 30 are inserted through the tubular holes 29 and the openings 28 of the intermediate plate 20 (FIG. 8), then the free ends of the cylindrical pins 39 are deformed thermally to press against the shoulders 29A of the tubular holes 29 (FIG. 9).

As shown more particularly on FIG. 6, complementary centring means for centring the intermediate plate 20 on the sub-plate 30 are provided in this case. These complementary centring means comprise a rib 28A extending on the rear side of the intermediate plate 20, along its outer edge 27, and a matching groove 38A extending on the front side 31 of the sub-plate 30 to house the rib 28A of the intermediate plate 20.

This invention is not limited to the embodiment described and shown, and those skilled in the art will be able to add any variant without departing from its scope. In particular, in the second embodiment of the invention shown on FIG. 10, the undetachable means for assembling the sub-plate 50 and the intermediate plate 40 could be gluing means.

As shown on FIG. 7, the shapes of the intermediate plate 40 and the sub-plate 50 are similar to those of the intermediate plate and sub-plate shown on FIGS. 1 to 9, with a front side 41, 51 and an opposite rear side, an outer edge 47, 57 and inner edge 43, 53 which are substantially square, and a central opening 42, 52.

The recessed housing 44 on the front side 41 of the intermediate plate 40 is in this case identical to that of the intermediate plate shown on FIGS. 1 to 9.

The means for mounting the sub-plate 50 on the apparatus support 5 are also identical to those of the sub-plate shown on FIGS. 1 to 9.

The complementary centring means 48, 58 for centring the sub-plate 50 on the intermediate plate 40 are also identical to those of the sub-plate shown on FIGS. 1 to 9.

However, as shown on FIG. 10, the undetachable means for attaching the sub-plate 50 on the intermediate plate 40 are different from the means for attaching the intermediate plate and sub-plate shown on FIGS. 1 to 9.

These attachment means comprise more particularly two double-sided adhesive strips 60 inserted between the intermediate plate 40 and the sub-plate 50, on each side of their central openings 42, 52. In this case, the bonding surfaces and the adhesion coefficients of these double-sided adhesive strips 60 are such that the intermediate plate 40 and the sub-plate 50 are undetachably assembled.

As a variant, these attachment means could comprise more adhesive strips. They could also consist of a single bead of glue applied on the sub-plate or on the intermediate plate, around its central opening.

As a further variant, other means for undetachably assembling the sub-plate and the intermediate plate could be used. In particular, these assembly means could consist of clipping or interlocking means. The intermediate plate and the sub-plate could also be overmoulded on top of each other.

Figure 12:
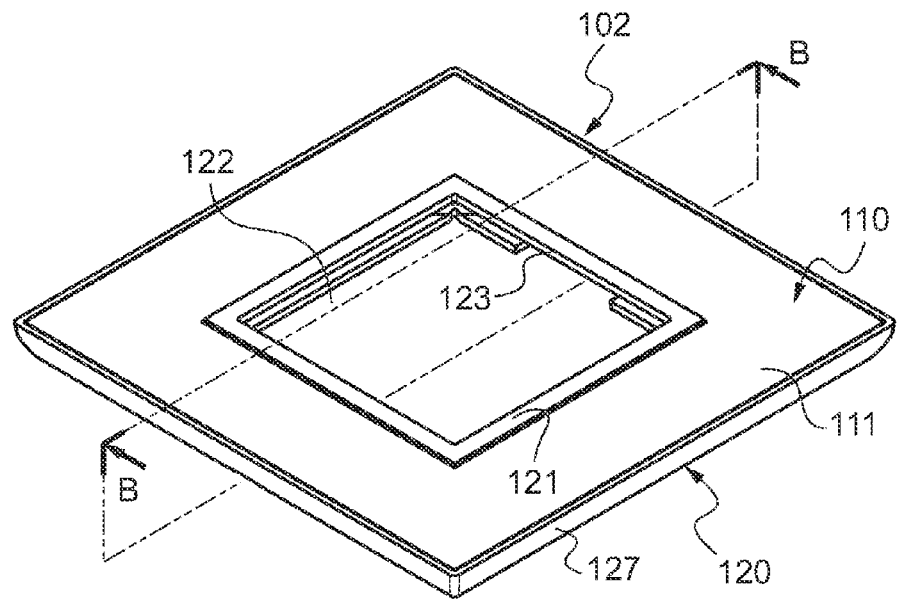
FIG. 12 is an assembled perspective view of the cover plate of FIG. 11.
Figure 13:
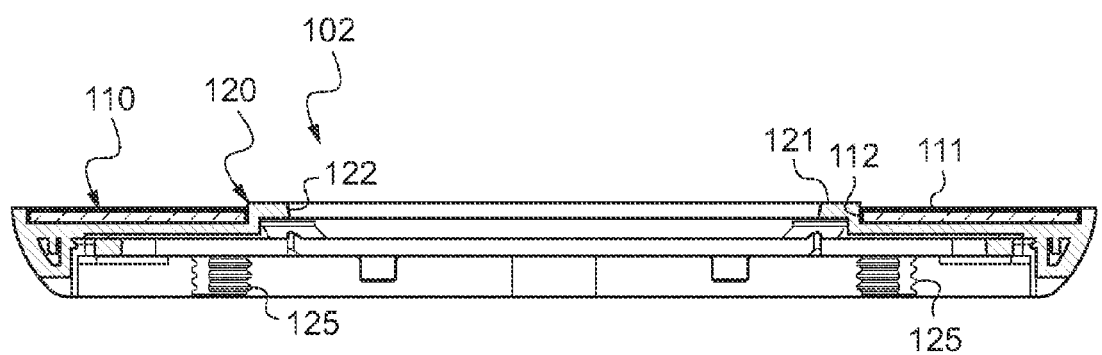
FIG. 13 is a cross-sectional view along plane B-B of FIG. 12.

In the third embodiment of the invention shown on FIGS. 11 to 13, the rear mounting plate 120 is formed from a single piece.

The cover plate 102 is therefore only formed by superimposing the front finish plate 110 and this monobloc rear mounting plate 120.

In this case, the shape of this rear mounting plate 120 is similar to that of the assembly formed by superimposing the sub-plate and the intermediate plate shown on FIG. 10.

More precisely in this case, it has the shape of a square flat frame 120A, delimited between a square outer edge 127 and an inner edge 123, also square, which defines a central opening 122. It comprises a front side 121 and a rear opposite side.

This rear mounting plate 120 comprises on the rear side the means 35 for mounting on the apparatus support and on the front side the housing 124 receiving the front finish plate 110.

As shown more particularly on FIG. 13, the means 125 for mounting the rear mounting plate 120 on the apparatus support are in this case identical to those of the sub-plate shown on FIGS. 1 to 9.

The shape of the housing 124 is, in negative, similar to that of the front finish plate 110. Its back wall is perfectly flat and has no centring opening. Its depth is strictly greater than the thickness of the front finish plate 110, such that the front side 111 of the front finish plate 110 lies below the front side 121 of the rear mounting plate 120 (see FIG. 13).

The rear mounting plate 120 is formed from a single piece by moulding a synthetic material, such as, for example, polycarbonate. In this case, the visible parts of this rear mounting plate 120 are advantageously covered with a coating which gives the cover plate 102 an aesthetic appearance.

The invention claimed is:

1. A cover plate for electrical apparatus comprising:
at least one opening intended to provide access to at least one functional part of the electrical apparatus, the cover plate is formed by superimposing a rear mounting plate fitted at the back with means for mounting on an apparatus support and a front finish plate giving said cover plate an aesthetic appearance, wherein said rear mounting plate includes on its front side a recessed housing which is delimited between an inner peripheral edge (25) bordering said opening (22, 32; 122) and an outer peripheral edge (26) and which completely houses said front finish plate such that the front side of said front finish plate extends flush with or is slightly back from the front side of said rear mounting plate.

2. The cover plate according to claim 1, wherein the rear mounting plate is formed from a single piece.

3. The cover plate according to claim 1, wherein the rear mounting plate is formed by superimposing an intermediate plate and a sub-plate, the intermediate plate being equipped with a recessed housing to house said front finish plate and the sub-plate including said mounting means on the rear side.

4. The cover plate according to claim 3, wherein the sub-plate and the intermediate plate are undetachably fastened to each other.

5. The cover plate according to claim 1, wherein the inner and outer peripheral edges are covered by a coating giving said cover plate an aesthetic appearance.

6. The cover plate according to claim 5, wherein said coating is made from chromium.

7. The cover plate according to claim 1, wherein the front finish plate and the rear mounting plate are undetachably fastened to each other.

8. The cover plate according to claim 1, wherein the front finish plate and the rear mounting plate are detachably fastened to each other.

9. The cover plate according to claim 1, wherein the front finish plate has a thickness of between 0.5 and 2 millimeters, preferably between 1 and 1.5 millimeters.

10. The cover plate according to claim 1, wherein the front finish plate includes a rigid core and a skin which covers at least the front side of the rigid core to give said cover plate an aesthetic appearance.

11. The cover plate according to claim 1, wherein the front finish plate and the rear mounting plate are made from different materials.

12. The cover plate according to claim 1, wherein the rear mounting plate is made by one or more moulding operations.

13. The cover plate according to claim 1, wherein the front finish plate is made by laser cutting.

14. Electrical apparatus including an apparatus support supporting an apparatus mechanism with on the front side at least one functional part, wherein the electrical apparatus includes the cover plate according to claim 1, whose opening borders the functional part of the apparatus mechanism and whose means for mounting the rear mounting plate are mounted in arrangements of the apparatus support.

* * * * *